United States Patent [19]

Pousette et al.

[11] 4,425,952

[45] Jan. 17, 1984

[54] LOG-FEED APPARATUS

[75] Inventors: Ronald D. Pousette, Vancouver; John L. Sanders, North Vancouver, both of Canada

[73] Assignee: Brunette Machine Works Ltd., New Westminster, Canada

[21] Appl. No.: 348,994

[22] Filed: Feb. 16, 1982

[51] Int. Cl.³ .......................... F16D 3/64; B27L 1/00
[52] U.S. Cl. ............................ 144/246 F; 198/624; 464/178
[58] Field of Search ............... 464/102, 104, 178, 179; 198/624; 144/246 F, 246 R

[56]   References Cited
U.S. PATENT DOCUMENTS

| | | |
|---|---|---|
| 2,785,715 | 3/1957 | Brundell et al. |
| 2,897,859 | 8/1959 | Annis, Jr. |
| 3,587,685 | 6/1971 | Morey |
| 3,596,690 | 8/1971 | Hamilton |
| 3,668,892 | 6/1972 | Alsch ................................. 464/178 |
| 3,774,660 | 11/1973 | Morey et al. |
| 4,058,151 | 11/1977 | Yonezu |

Primary Examiner—W. D. Bray
Attorney, Agent, or Firm—Kolisch, Hartwell & Dickinson

[57] ABSTRACT

A log-feed apparatus used in a log-feed assembly, where the assembly functions to advance a log along a transport axis in a log-debarking system. An elongated arm in the apparatus is mounted at an inner end for swinging of its outer end toward and away from the transport axis. A spiked feed roll, journaled on the outer arm end for powered rotation about the arm's long axis, is carried on the outer end of a shaft which is journaled on the arm by a pair of axially spaced bearings. A gear reducer mounted on the arm, intermediate the arm ends, is driven by an arm-mounted motor through a flexible belt drive. The output of the gear reducer is drivingly connected to the inner end of the shaft by a torsionally flexible rotary coupling. The shaft and bearings journaling the feed roll on the arm act to isolate all components of the drive train which extend between the shaft and motor from substantially all but torsional load transmitted by the feed roll during operation of the log-feed assembly.

4 Claims, 3 Drawing Figures

LOG-FEED APPARATUS

BACKGROUND AND SUMMARY

The present invention relates to log-feed apparatus used in a log-feed assembly, and in particular, to an apparatus having a spiked feed roll and a gear reducer through which drive is imparted to the feed roll—with the latter substantially shock-isolated from the former.

In the usual log-debarking system, a log is fed along a transport axis through a debarking ring by a pair of log-feed assemblies mounted on either side of the ring. Typically, each log-feed assembly includes three log-feed apparatus having elongated arms which are mounted for cooperative swinging of their free ends toward and away from the transport axis. A spiked feed roll is carried on the swinging end of each arm for engaging an outer surface portion of a log. The feed rolls are rotatably driven, at identical speeds, to advance a log along such axis.

In one type of roller feed apparatus known in the prior art, a feed roll therein is mounted directly on the output shaft of a gear reducer carried adjacent the outer, swinging end of the arm. The gear reducer, in turn, is powered by a hydraulic motor which is mounted on the arm and coupled to the gear reducer by rigid mechanical coupling. Alternatively, the driving motor may be located on the assembly frame, being rigidly coupled to the associated feed roll by a complex right-angle gear reducer.

A characteristic operational feature of a log-debarking system of the general type described is that the feed rolls experience considerable radially directed shock as the roller arms track with the surface of a log. In the prior art log-feed apparatus just-described, such radial shock is transmitted directly to the associated gear reducer and other driving components, with the result that all such components experience significant abuse, and may require frequent repair or replacement. Such drive components are stressed further by torsional shock which occurs as the associated power-driven feed roll encounters irregularities on a log's surface.

Aggravating the effect of radial and torsional shock in many log feeders of the type mentioned in prior art is the presence of rigid drive coupling throughout.

It is one object of the present invention to provide, in a log-feed assembly, log feed apparatus which substantially reduces radial and torsional shock transmitted from a feed roll in the apparatus.

A more specific object of the invention is to provide, in such an apparatus, a feed roll journal construction which isolates components in the roll's drive train from substantially all but torsional loads transmitted by the roll.

Still another object of the present invention is to provide, in such an apparatus, a yieldable drive coupling between a gear reducer and a drive motor in the drive train for the apparatus.

It is yet another object of the invention to provide such an apparatus which is simple in construction.

The log-feed apparatus of the present invention is constructed for use in a log-feed assembly used in advancing a log along a transport axis in a log-debarking system. The apparatus includes an elongated arm mounted at an inner arm end for swinging of its outer end toward and away from the transport axis. A spiked feed roll mounted on the outer arm end for rotation about the arm's long axis is carried on a shaft which is journaled on the arm by a pair of axially spaced bearings. A motor mounted adjacent the inner arm end acts through a gear reducer mounted on the arm, intermediate the arm ends, to drive the feed roll. The motor is drivingly connected to the input of the gear reducer by a flexible belt drive, with the output of the gear reducer being drivingly connected to the shaft carrying the feed roll by a rotary shaft coupling. The shaft and bearings journaling the roll on the arm act to isolate all other drive components for the roll from substantially all but torsional loads transmitted by the feed roll. The isolated shock loads are transmitted directly through the bearings to the arm.

These and other objects and features of the present invention will become more fully apparent when the following detailed description of a preferred embodiment of the invention is read in conjunction with the accompanying drawings, wherein:

DETAILED DESCRIPTION OF A PREFERRED EMBODIMENT OF THE INVENTION

Figure 1:
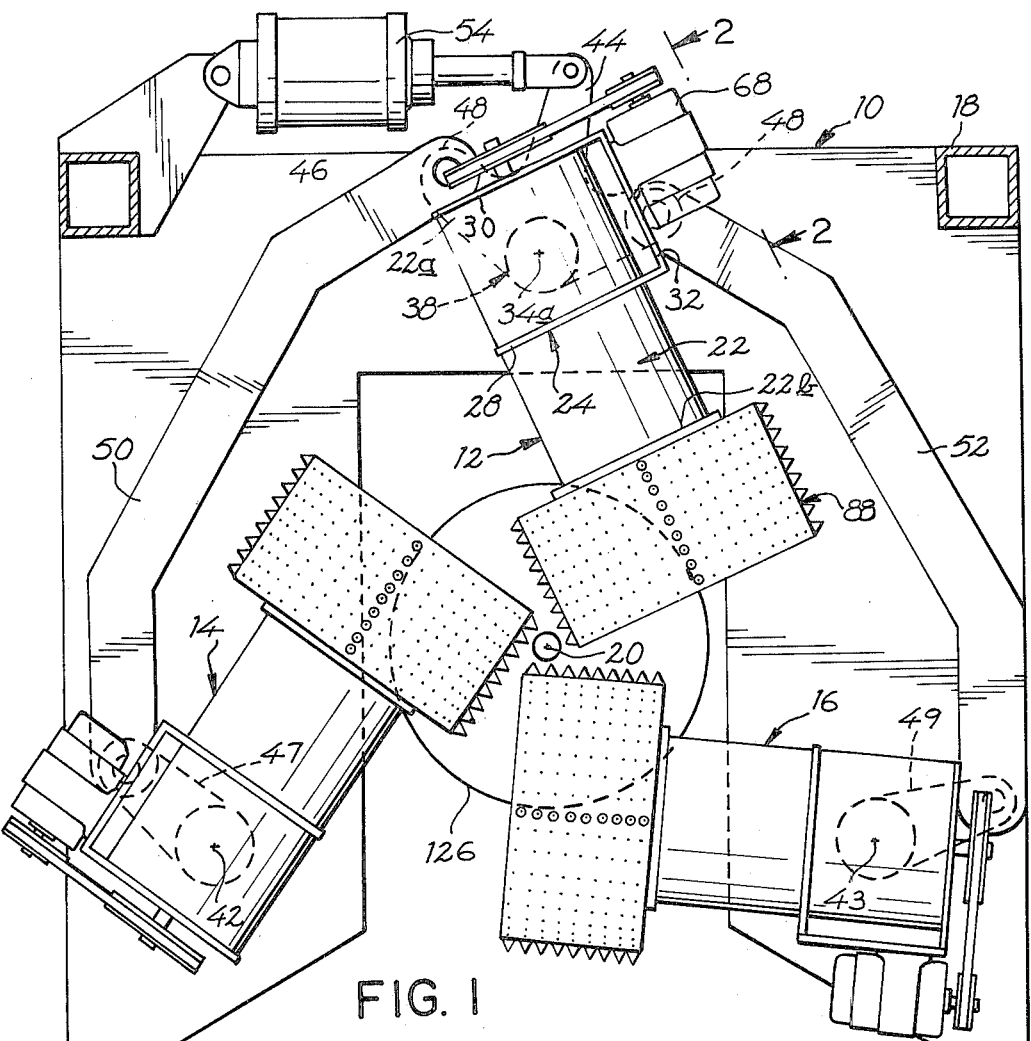
FIG. 1 is a front view of a log-feed assembly employing apparatus constructed according to the present invention.

In FIG. 1 there is shown at 10 a log-feed assembly employing three log feed apparatus 12, 14, 16, constructed according to the present invention. The three apparatus are mounted on a frame 18 in assembly 10 for coordinated swinging toward and away from a log transport axis 20 extending perpendicular to the plane of the figure. The mounting and construction of the apparatus in the invention, to the extent that the three apparatus are similar, will be described with reference to apparatus 12.

Apparatus 12 includes an elongate swing arm 22 having an upper (inner) mounting end 22a and a lower (outer) swinging end 22b. A mounting assembly 24 is used in mounting arm 22 on frame 18. Assembly 24 includes a pair of plates 28, 30 which are attached, as by welding, to the outside of arm 22 in a manner which will be described more fully below with reference to FIG. 3. These two plates are joined along the right side of arm 22 in FIG. 1 by a motor-support plate 32.

Figure 2:
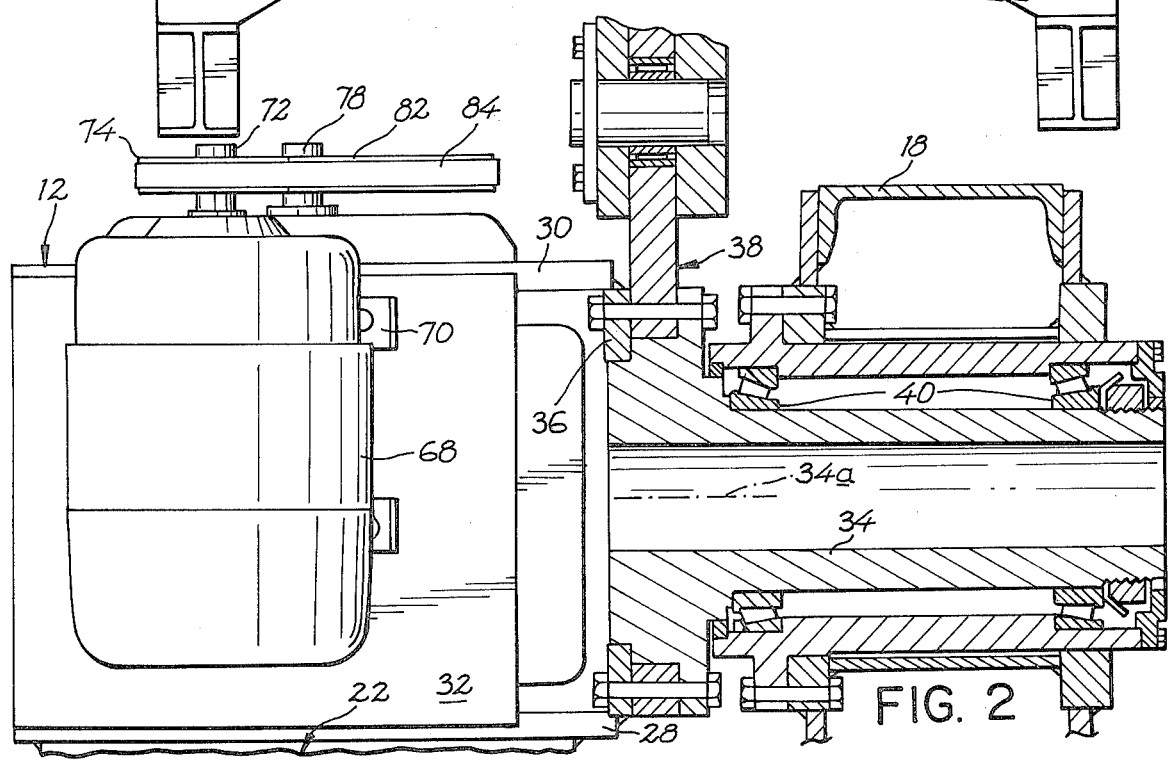
FIG. 2 is an enlarged view, partly in section, taken generally along line 2—2 in FIG. 1.

Arm 22 is pivoted on frame 18 in a manner now to be described with reference to FIG. 2 along with FIG. 1. In FIG. 2, it is the sectional portion thereof which illustrates this pivot connection. As seen in this figure, a hollow shaft 34 is bolted to a shaft-mounting plate 36 which extends between plates 28, 30 and is secured thereto as by welding. A three-armed bell crank 38, whose function will become clear shortly, is sandwiched between plate 36 and a flanged portion of shaft 34, being thus mounted for pivoting with arm 22, as shown. Shaft 34 is journaled on frame 18 by a pair of axially spaced bearings 40. The arm is thus mounted, adjacent inner end 22a, for swinging about the shaft's axis, which is indicated by dash-dot line 34a in FIG. 2, and which extends normal to the plane of FIG. 1. Apparatus 14, 16 are similarly mounted on frame 18 for swinging about axes 42, 43 respectively, (FIG. 1) paralleling axis 34a. The three just-mentioned swing axes are equally spaced from one another and from axis 20, as can be appreciated in FIG. 1.

With continued reference to FIG. 1, bell crank 38 includes a central arm 44 flanked on either side by a pair of coupling arms 46, 48. Apparatus 12 is linked to apparatus 14, for coordinated swinging movement toward and away from axis 20, by a linkage arm 50 pivotally joining arm 46 with a crank 47 coupled to apparatus 14. Apparatus 16 is similarly linked to apparatus 12, for coordinated swinging therewith, by a linkage arm 52 joining arm 48 with a crank 49 coupled to apparatus 16. An air cylinder 54 pivotally interposed between frame 18 and arm 44 in the bellcrank is operable to control the coordinated swinging movement of the three apparatus toward and away from axis 20.

Figure 3:
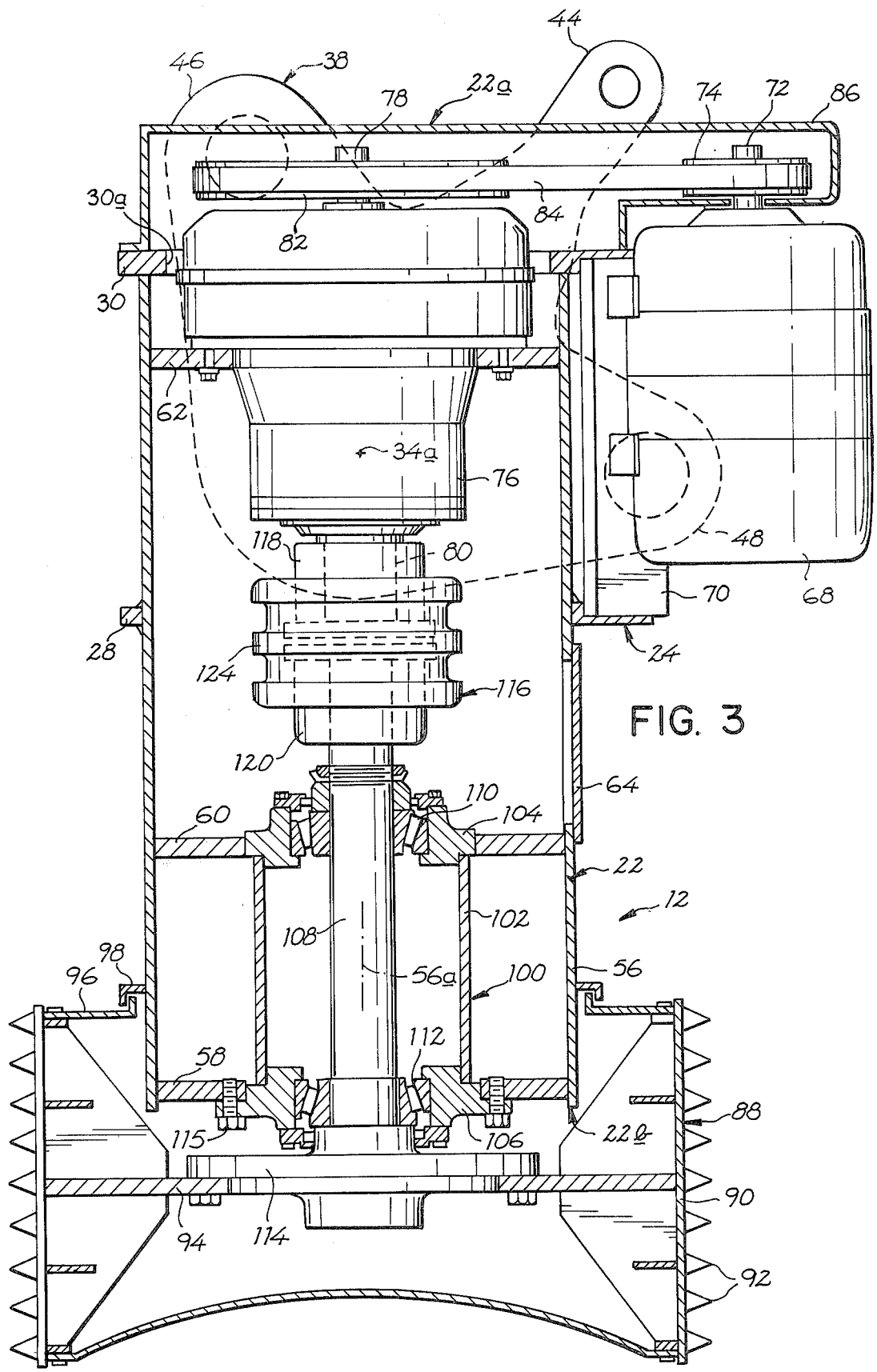
FIG. 3 is a sectional view of substantially the same scale as FIG. 2, showing details of construction of one of the three log-feed apparatus forming part of the assembly of FIG. 1.

Details of apparatus 12 will now be described with reference particularly to FIG. 3. Arm 22 is composed of a tubular section 56 which is preferably formed of tubular steel or the like. The central longitudinal axis of section 56 is indicated by a dash-dot line 56a. Three ring-like members 58, 60, 62 are secured, as by welding, to the interior wall of section 56 at the positions shown. Also as seen in FIG. 3, plate 28 in assembly 24 encircles section 56, and plate 30 in the assembly is welded to the upper end thereof. A removable plate 64, attached as by bolts (not shown) to section 56, provides lateral access to the inside thereof.

A motor 68 in the apparatus is mounted on plate 32 in assembly 24 by a brace 70. The motor's output shaft 72 carries a pulley 74 for rotation therewith about the shaft's axis. Motor 68, which is also referred to herein as power-operated drive means, is preferably an electric motor.

A gear reducer 76 in the apparatus is bolted to member 62, with an upper (input end) portion of the reducer in the figure extending through an opening 30a in ring 30, and with a lower portion extending through a suitable clearance-fit opening in member 62. Reducer 76 produces gear reduction in a conventional manner between an input shaft 78 and an output shaft 80, where both of these shafts rotate about axis 56a. A pulley 82 carried on the reducer's input shaft is coupled to shaft 72 by a flexible belt 84 encircling the pulleys on the two shafts. A belt cover 86 is carried on assembly 24 as shown in FIG. 3. The cover is not shown in FIGS. 1 and 2. Belt 84 is also referred to herein as belt drive means.

A spiked feed roll 88 in apparatus 12 is constructed of a rigid cylindrical member 90 whose outer surface is studded with log-engaging spikes, such as spikes 92. A ring-like mounting plate 94 in the feed roll is welded to the inner surface of member 90 as shown. A pair of relatively rotatable annular shield elements 96, 98, mounted on feed roll 88 and on section 56, respectively, form a rotary seal which prevents entry of airborne particles, wood chips, and the like into the interior of the feed roll.

According to an important feature of the present invention, roll 88 is journaled on arm 22, for rotation about axis 56a, by a shaft and bearing assembly 100 which functions to shock-isolate other components of the drive train for the roll from the roll itself. Assembly 100 is composed of a cylindrical casing 102 having welded to its opposite ends inner and outer bearing mounts 104, 106, respectively. A shaft 108 in the assembly is mounted for rotation about axis 56a by inner and outer bearings 110, 112, respectively, carried in mounts 104, 106, respectively. A hubbed disc 114 is anchored to the outer end of shaft 108 (the lower shaft end in FIG. 3) for rotation therewith. Roll 88 is bolted to disc 114 as shown.

An annular stepped portion of mount 106 is received in a central opening formed in member 58, in clearance fit therewith. Assembly 100 is secured to arm 22 by bolts, such as bolt 115, securing mount 106 to member 58 as shown. Mount 104 is received, in clearance fit, in a suitable central opening formed in member 60. Assembly 100 is thus rigidly mounted on arm 22 for transmitting shock forces experienced by the feed roll directly to the arm, substantially in the direction of the experienced force.

Shaft 108 is drivingly connected to output shaft 80 in the gear reducer by a torsionally flexible rotary coupling, or coupling means, 116. Exemplary of a rotary coupling which can be used in the present invention is a conventional FALK-type steelflex coupling manufactured by the Falk Corporation of Milwaukee, Wisconsin. The coupling is formed of a pair of axially confronting hubs 118, 120 in which shafts 80, 108, respectively, are received by press fit. The two hubs in the coupling are torsionally coupled by a serpentine spring (not shown) held within a removable cover 124. Details of a coupling, such as the one described herein, are set forth in bulletin 421-110 published by the Falk Corporation. For purposes of the present invention, it is sufficient to note that coupling 116 provides torsional resilience between the two hubs, and thus can act to smooth out torsional shock transmitted from shaft 108 to shaft 80. The coupling also allows limited angular flexibility between the coupled shafts.

The view of apparatus presented in FIG. 1 represents what will be recognized by those skilled in the art as the discharge or downstream side of a ring-type log-debarking system. On the far side of the assembly in FIG. 1 from the viewer, at the location of the intake side of the assembly is a rotating ring 126 carrying a plurality of debarking arms (not shown), and beyond that is another log-feed assembly similar in substantially all respects to assembly 10.

For the purpose of explaining the operation of the invention, let us assume that a debarking operation is under way, and that, in particular, a log with certain bumps and other irregularities is being debarked. This log will, in a manner well known to those skilled in the art, have been fed into the system, substantially along axis 20, where, once it has passed through the ring, it will have become engaged by the spikes in all six of the feed rolls in the two log-feed assemblies. Transport of the log through the system, from this stage of operation on, is under the influence of these power-driven rolls.

As the log travels along axis 20, and in particular, as irregularities in the log are encountered, such encounters produce both torsional and radial shock loading in the feed rolls as the same try to maintain that portion of the log which they are surrounding centered on axis 20. Such encountering produces, in effect, a jarring of the feed rolls. In apparatus 12, which is representative, this jarring shock is transmitted from roll 88 directly to arm 22 through assembly 100, effectively isolating the gear reducer and coupling from such shock. Coupling 116 and the yieldable belt coupling between motor 68 and the input end of the gear reducer also act to reduce shock-related stress in the apparatus. These shock-isolation features in the invention are in contrast to the prior art.

While a preferred embodiment of the invention has been described herein, it is apparent that various changes and modifications may be made without departing from the spirit of the invention.

It is claimed and desired to secure by letters patent:

1. In a log-feed assembly having a frame defining a transport axis for a log, log-feed apparatus comprising
    an elongated arm, having ends, pivoted on said frame for swinging of one of said ends toward and away from said transport axis,
    power-operated drive means mounted on said arm adjacent the other end thereof,
    a speed reducer mounted on said arm intermediate its said ends,
    belt drive means operatively interconnecting the output of said power-operated means and the input of said reducer,
    a log-engaging feed roll, and journaling means journaling said roll on said arm adjacent the arm's said one end, and
    rotary coupling means operatively coupling the output of said speed reducer to said feed roll,
    said journaling means substantially isolating said rotary coupling means and said speed reducer from all but torsional loads transmitted by said feed roll.

2. Apparatus for feeding a log along a transport axis in a log-feed assembly comprising
    an elongated arm, having ends, mounted for swinging of one of its ends toward and away from said axis,
    a log-engaging feed roll, and journaling means journaling said roll on said arm, adjacent said one end,
    power-operated means for driving said feed roll, mounted on said arm adjacent the other end thereof, and
    torque-transmitting coupling means interposed in a drive train connecting said feed roll and said power-operated means,
    said journaling means and said coupling means substantially isolating said power-operated means from all but torsional loads transmitted by said feed roll.

3. The apparatus of claim 2, wherein said journaling means includes a shaft and a pair of bearings journaling the shaft on said arm at axially spaced shaft positions.

4. The apparatus of claim 3, wherein said coupling means includes a torsionally flexible rotary coupling.

* * * * *